April 22, 1958 J. J. EBERS ET AL 2,831,984

CROSSPOINT SWITCHING CIRCUIT

Filed June 16, 1955 2 Sheets-Sheet 1

INVENTORS J. J. EBERS
S. L. MILLER

BY [signature]

ATTORNEY

April 22, 1958 J. J. EBERS ET AL 2,831,984
CROSSPOINT SWITCHING CIRCUIT
Filed June 16, 1955 2 Sheets-Sheet 2

INVENTORS J. J. EBERS
S. L. MILLER
BY [signature]
ATTORNEY 2,831,984

CROSSPOINT SWITCHING CIRCUIT

Jewell J. Ebers, Whippany, and Solomon L. Miller, Murray Hill, N. J., assignors to Bell Telephone Laboratories, Incorporated, New York, N. Y., a corporation of New York Application June 16, 1955, Serial No. 515,866

3 Claims. (Cl. 307—88.5)

This invention relates to switching systems and more particularly to such systems including semiconductor signal translating circuits which exhibit negative resistance throughout a substantial portion of their operating range.

In the operation of a variety of electrical systems there is need for a connecting link in a transmission path which can be transferred readily and efficiently from a high-impedance low-current condition to a low-impedance high-current condition without the introducton of appreciable transmission loss. In telephone switching systems, for example, it is desirable to provide a plurality of crosspoint switches to define a number of possible paths between selected ones of a number of input and output lines or trunks. It is further desirable in systems of this type, such as that disclosed in the patent to E. Bruce et al., 2,684,405, granted July 20, 1954, that the crosspoint switches utilized for establishing connections through the telephone switching network also be employed to convey the intelligence or voice signal currents therethrough.

It is manifest, therefore, that the impedance presented by such talking path switches should have a low resistive component in order that the switches introduce a minimum of attenuation to the voice signals. Better still, to avoid attenuation of talking power and further to cancel some of the other losses associated with the switching network, such switches should exhibit a negative resistance in their operating or low-impedance, high-current range whereby the voice signal actually is amplified during transmission.

Switching systems employing crosspoint switches having some negative resistance are known in the art as is shown, for example, in the above-identified patent to E. Bruce and H. M. Straube wherein the crosspoints are gaseous discharge devices and in application Serial No. 334,552, filed February 2, 1953, of B. G. Bjornson and E. Bruce wherein the crosspoints are point contact transistors. Such switches include cold cathode gaseous discharge devices and point contact transistors and generally are of the type which exhibit a negative resistance only in the low operating current region near the breakdown point, or, as in the Bruce-Straube patent, in that region and in a further high operating current region which is separated from the low-current region by a region of positive resistance. The first negative resistance region is difficult to utilize practically as the negative slope occurs at such low values of current that extremely high load impedances are required and changes so rapidly with the current that a static operating point is difficult to maintain. The second or high-current region is satisfactory for many applications, but since it is separated from the breakdown point by a region of positive resistance, the load impedance and operating conditions are to that extent limited.

Advantageously, the crosspoint switch should exhibit a continuous negative resistance throughout its entire operating range and over as wide a range of currents as possible. Further, the crosspoint switches should be reliable in that their operating characteristics are reproducible not only from switch to switch, but from one measurement to another in the same switch.

Still further, the crosspoint switch advantageously should have a direct current voltage across its terminals in its operated or high-current state to avoid crosstalk and the other difficulties which can arise in the associated crosspoint devices of the switching system due to the characteristic low impedance of such devices near zero current and voltage, particularly when such devices are transistors.

Still further, the operation of a crosspoint switch employing transistors should be rapid in response to triggering signals, and delays of the type caused by driving the transistors into saturation should be avoided.

It is an object of this invention to provide an improved switching system having transistor crosspoint switches in accordance with the desirable characteristics described above.

More specifically, it is an object of this invention to provide a talking path crosspoint switch having the characteristic of negative resistance throughout its entire operating range after the breakdown point.

It is another object of this invention to provide a crosspoint switch having a continuous negative resistance characteristic which is stable and reproducible.

It is a further object of this invention to provide a crosspoint switch having a continuous negative resistance characteristic and which is rugged, small, inexpensive and requires comparatively low operating power.

It is a still further object of this invention to provide a crosspoint switching network comprising crosspoint switches having the characteristic of continuous negative resistance in the low-impedance high-current range selecting paths through said network and for conveying the intelligence therethrough.

It is another object of this invention to provide a crosspoint switching network comprising crosspoint switches having sufficiently large potential drops thereacross to avoid operating associated ones of such switches in their low-impedance states.

It is still another object of this invention to provide a crosspoint switching circuit comprising transistor crosspoints, the transistors not being driven into the saturation region and therefore responding rapidly to all operating signals.

These and other objects are realized in a specific illustrative embodiment of this invention in which a plurality of two terminal switch circuits, each exhibiting the characteristic of continuous negative resistance in its low-impedance high-current range, are utilized to establish connections through a switching network, which connections may selectively be made to complete transmission paths between desired ones of a plurality of input and output conductors. Each two terminal switching circuit advantageously comprises an avalanche transistor, that is, a transistor having a collector junction in which the reverse collector voltage is made sufficiently high to cause carrier multiplication to take place and provide an alpha or current gain greater than unity. The collector of the transistor is connected to one terminal, the emitter to the other terminal and an impedance is connected between the emitter and the base. The switching circuit presents a high impedance to the input terminals until the reverse voltage applied across the collector junction is sufficient to cause avalanche breakdown in the transistor and transfer a major portion of the current flow from the base-collector loop to the emitter-collector loop. The circuit then presents a continuous negative resistance throughout its entire low-impedance high-current operating range.

In one embodiment of the invention, a nonlinear impedance element, which advantageously may be a silicon diode, is connected in the emitter circuit of the avalanche transistor switch. As a silicon diode possesses the characteristic of passing very little current in the forward direction until the voltage thereacross reaches a given value, such as one-half of a volt, this diode acts to delay the "turning on" of the emitter until after the body breakdown voltage has been reached.

In another embodiment of this invention, a bias battery is connected in the emitter circuit. This battery is poled to apply a reverse bias to the emitter and thus serves to prevent the emitter from being "turned on" until this reverse bias is overcome by the forward bias presented by the base circuit impedance.

In still another embodiment of this invention, a semiconductor element, which advantageously may be a germanium diode, is connected in the base circuit. Due to the reverse characteristic exhibited by such diodes of low impedance for currents up to the saturation level and of high impedance thereafter, the switching of the transistor current from the base circuit to the emitter circuit is facilitated by the sharp increase in impedance in the base loop.

It is a feature of this invention that a crosspoint switching network comprise a plurality of two state switching circuits, each of said circuits being selectively operable from a high-impedance low-current state to a low-impedance high-current state, the latter state being characterized by a continuous negative resistance.

It is a further feature of this invention to utilize in a crosspoint network, a two terminal switching circuit comprising an avalanche transistor.

It is a still further feature of this invention that such an avalanche transistor be utilized with an impedance connected to its base electrode to provide a continuous negative resistance in its low-impedance high-current operating range.

It is another feature of this invention that the continuous negative resistance characteristic of such an avalanche transistor switching circuit be determined by the addition of a bias element in the emitter circuit of the avalanche transistor. More specifically, it is a feature of this invention that a bias battery or a silicon or other diode be placed in the emitter circuit of an avalanche transistor switch to reverse bias the emitter and delay the emitter current from flowing until the transistor body breakdown voltage has been reached.

It is still another feature of this invention that the base circuit impedance of the avalanche transistor switch be changed from a low-impedance value to a high-impedance value to enable the transfer of the transistor current from the base-collector loop to the emitter-collector loop after body breakdown. More specifically, it is a feature of this invention to utilize a germanium or other diode in the transistor base circuit, which diode changes from a low to a high impedance when its current reaches saturation, to facilitate current transfer from the base to the emitter circuits.

It is still another feature of this invention that the avalanche transistor switch is never driven below its sustain voltage and into the saturation region, thereby always providing a potential at least equal to the sustain voltage across its terminals to bias the associated avalanche transistor switches of the cross-point network away from their zero current and voltage states when the first-mentioned switch is in its operate condition.

A complete understanding of this invention, together with the above-noted and other features thereof, may be gained from consideration of the following detailed description and the accompanying drawing, in which.

Figure 1:
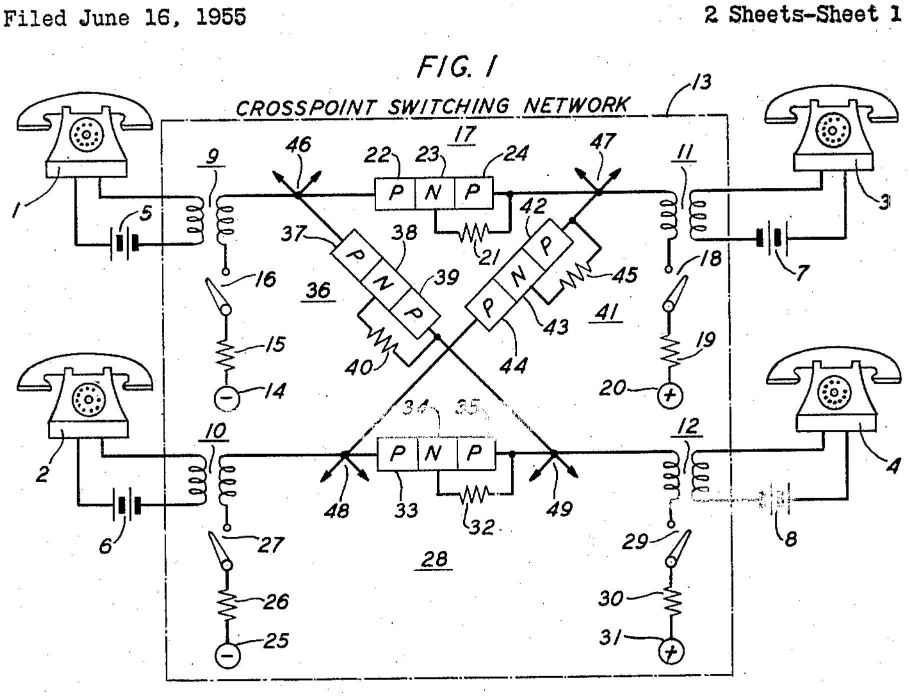
Fig. 1 is a greatly simplified illustrative embodiment of an avalanche transistor switching system in accordance with the instant invention.

Referring now to the drawing, Fig. 1 shows in greatly simplified form a switching system which utilizes avalanche transistor circuits as talking path crosspoint switches. Crosspoint switching networks, as such, are well known, as is shown by the patent to E. Bruce et al., identified above. Briefly, such a network provides means whereby any of a plurality of information stations such as telephone substations may be placed in information communication with any of a further plurality of such stations by the selective operation of one or more crosspoint switches connected therebetween. Fig. 1 shows a plurality of subscriber substations 1, 2, 3 and 4, each connected through a subscriber loop comprising the voltage sources 5, 6, 7 and 8 and the primary windings of transformers 9, 10, 11 and 12, respectively, to a crosspoint switching network 13.

For the purpose of facilitating the explanation of the invention, crosspoint switching network 13 is shown as having only a single stage comprising four crosspoint switching circuits, thus enabling either of the substations 1 and 2 to be connected to either of the substations 3 and 4, but it will be understood by those skilled in the art that in practice a much greater number of crosspoints will be provided to enable transmission paths to be completed between a large number of input and output conductors. It further will be understood by those skilled in the art that when used in a telephone system, such a crosspoint network advantageously may be located in a central office or in a remote line concentrator between the subscriber stations and a central office.

The illustrative crosspoint switching network 13 comprises a first circuit including, in series, a source of negative potential 14, a resistance 15, a switch 16, the secondary winding of the transformer 9, a transistor 17 of the type employing avalanche multiplication, herein referred to as an avalanche transistor, the secondary winding of the transformer 11, a switch 18, a resistance 19, and a source of positive potential 20. For the purposes of illustration avalanche transistor 17 is disclosed as a junction transistor of the P–N–P type and is shown as comprising a plurality of contiguous zones 22, 23 and 24, defining a collector, a base, and an emitter, respectively. A resistance 21 is connected between the base 23 and a terminal of the emitter 24. It will be understood by those skilled in the art that the principles of the invention fully are applicable to all other types of avalanche transistors, such as junction transistors of the N–P–N type and to transistors having a collector junction and a point contact emitter.

Crosspoint switching network 13 further comprises a second circuit similar to the first circuit described above, which includes, in series, a source of negative potential 25, a resistance 26, a switch 27, the secondary windings of transformer 10, an avalanche transistor 28 with a resistance 32 connected between its base 34 and a terminal of its emitter 35, the secondary windings of transformer 12, a switch 29, a resistance 30, and a source of positive potential 31.

An avalanche transistor switching circuit comprising an avalanche transistor 36 having a resistance 40 connected between its base 38 and a terminal of its emitter 39 is connected between terminals 46 and 49. Similarly, a switching circuit comprising an avalanche transistor 41 having a resistance 45 connected between its base 43 and a terminal of its emitter 42 is connected between terminals 47 and 48.

In the operation of the illustrative system of Fig. 1, either of the two substations 1 or 2 may be connected to either of the substations 3 or 4 by the selective breakdown of one of the four crosspoint switching circuits. Thus, with all of the switches 16, 18, 27 and 29 open, no potentials are applied across the avalanche transistors 17, 28, 36 and 41 and the substations remain isolated from each other. When the proper switches are closed, the associated avalanche transistor has a reverse biasing potential applied across its collector junction sufficient to cause avalanche breakdown to take place and change the circuit from a high-impedance, low-current state to a low-impedance, high-current state whereby the substations connected thereto are placed in information communication with each other. In accordance with an aspect of this invention, the operated avalanche transistor switch also serves as a talking path in which amplification is provided due to the continuous negative resistance exhibited by the switch in this condition.

An avalanche transistor generally may be described as a semiconductor device comprising a collector junction across which a reverse voltage of given amplitude may be applied to cause carrier multiplication to take place and give rise to an alpha or current gain greater than unity. In transistors of this type, such as those disclosed in the copending application of K. B. McAfee, Serial No. 340,529, filed March 5, 1953, now Patent 2,790,034, granted April 23, 1957, the collector junction is defined by a pair of contiguous zones of semiconductive material, one of the zones being a base region and the other a collector region. In each zone charge carriers of one polarity predominates, there being a majority of positive carriers or holes in a p-type zone and a majority of negative carriers or electrons in an n-type zone. In operation of these devices, minority carriers, i. e., carriers of the polarity opposite that in excess in the base zone, are injected into the base zone. Such injection may be effected, for example, by a point contact emitter bearing against the base zone or through the agency of a third zone forming an emitter junction with the base zone.

The collector junction is biased in the reverse or high resistance direction so that the collector zone is of the polarity to attract the injected carriers. A multiplication of these carriers can be obtained over a given range of field strengths across the reverse biased collector junction up to a critical point, known as the avalanche breakdown point, at which small further increases in voltage result in very large increases in the number of carriers flowing across the junction. In fact, at the junction body breakdown voltage, multiplication of the carriers becomes essentially infinite. The current then increases rapidly, being limited only by the external circuit resistance.

The characteristic of continuous negative resistance after breakdown is obtained in accordance with this invention by the addition of an impedance to the base circuit of the avalanche transistor. The purpose of this external impedance is effectively to switch the current from the base collector loop to the emitter collector loop. Another way of interpreting its effect is that the external impedance changes the effective alpha of the avalanche transistor by causing a higher percentage of the total current to be injected minority carrier current.

Figure 2:
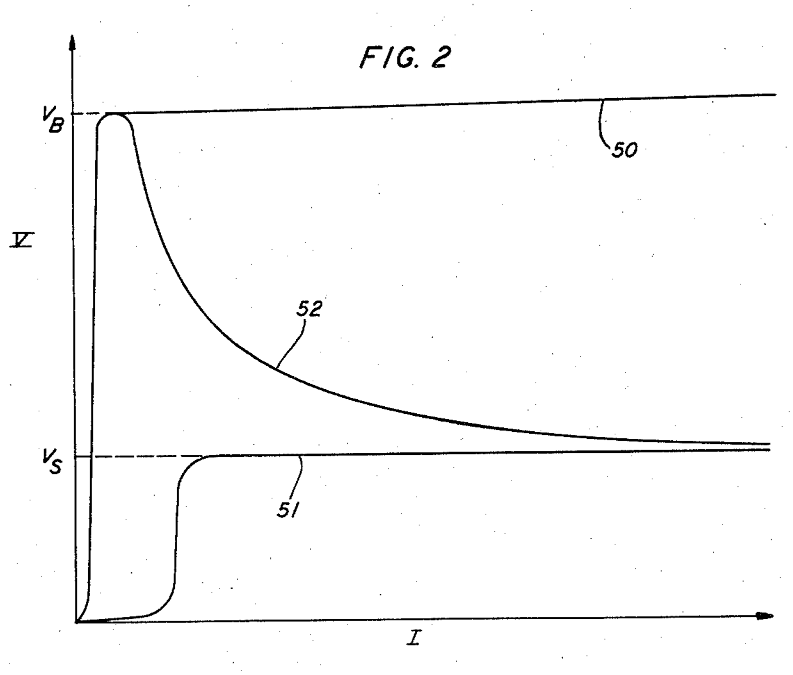
Fig. 2 is a plot showing the voltage-current characteristics of a two terminal avalanche transistor switch of the type utilized in the system of Fig. 1.

This can be seen more clearly with the aid of the curves in Fig. 2 of the drawing. Curve 50 is the normal reverse collector to base voltage-current characteristic with the emitter open, viz., across the avalanche multiplication region alone. Here the base to collector breakdown occurs at $V_B$, the voltage at which the avalanche multiplication becomes infinite and leads to near zero incremental resistance as shown by the slightly rising curve 50. Since the emitter is open circuited, it does not contribute any minority carriers to the discharge.

Curve 51 is the reverse characteristic of the collector junction as measured collector to emitter with the base open. Because of continuity of current requirements, the emitter to collector breakdown occurs when the collector voltage reaches $V_s$, the voltage at which the multiplication M times the value of the low voltage current gain, $\alpha_0$, becomes unity, that is, when $\alpha_0 M=1$.

The base impedance enables the avalanche transistor switching circuit to exhibit a continuous negative resistance by causing the circuit to go from the condition of curve 50 to the condition of curve 51 with increasing current, as shown by curve 52 of Fig. 1. For very low currents the impedance of the emitter junction is high since the voltage-current characteristic is exponential in character and most of the current flows through the base impedance. As the voltage is increased essentially curve 50 is traced out. Near the breakdown voltage $V_B$, the current through the base impedance becomes greater and increases the emitter-to-base biasing voltage in the forward direction. This results in the impedance of the emitter junction becoming smaller in comparison with the base impedance and causes the emitter current to increase. Thus, curve 52 begins to depart from curve 50, and as a larger and larger fraction of the total current is transferred from the base circuit to the emitter circuit, curve 52 approaches curve 51 asymptotically, realizing a continuous negative resistance.

For example, in one specific embodiment of this invention wherein the avalanche transistor was of the P–N–P germanium type, the various circuit operating parameters had the following values:

| | | |
|---|---|---|
| Body breakdown voltage $V_B$ | volts | 36 |
| Sustain voltage $V_s$ | do | 13 |
| Low voltage alpha $\alpha_0$ | | .95 |

At a typical operating point, such as,

| | | |
|---|---|---|
| Transistor voltage V | volts | 16 |
| Transistor current I | ma | 6 |

the negative resistance of the switch was found to be equal to 450 ohms.

Fig. 2 illustrates another advantage of the avalanche transistor switching circuit over prior art transistor switching circuits. In point contact or hook collector transistors, for example, there is a limitation on the switching speed due to the storage of minority carriers. This phenomenon particularly manifests itself when the transistor switch is opened after it has been driven into the current saturation region. At saturation there is an excess of minority carriers in the semiconductor body. Thus, the crosspoint becomes insensitive to further signals for an additional period of time due to the necessity for removing these excess carriers. This recovery period can be sufficiently time consuming erroneously to slow down the operating speed of the switch. In switching circuits utilizing avalanche transistors, however, the minimum collector voltage is automatically limited to the sustain voltage, $V_s$, and the transistor never goes into the current saturation region. Therefore, the collector junction never becomes forward biased and the storage of minority carriers, which usually results therefrom, is eliminated.

The limitation of the minimum collector voltage of the avalanche transistor switching circuit to the sustain voltage $V_s$ also results in the elimination of crosstalk and the other problems which arise in transistor crosspoint switching systems due to the characteristic low impedance of these devices at zero current and voltage. The sustain voltage of an operated avalanche transistor switch is sufficient to bias to the high impedance range all of the unoperated transistor switches connected thereto. Thus, the sustain voltage acts to eliminate undesired low impedance connections between the conductors of the switching system and insures private and interference free subscriber service.

Figure 3:
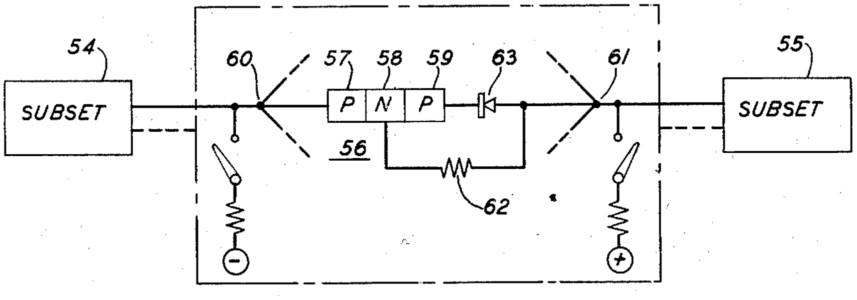
Figs. 3, 4 and 5 show the details of several other embodiments of a two terminal avalanche transistor switch in accordance with this invention which may be utilized in the system of Fig. 1.

It will be appreciated by those skilled in the art that the negative resistance characteristic of the avalanche transistor switching circuits disclosed in Fig. 1 of the drawing may be modified to suit the requirements of a given circuit configuration in accordance with the principles of the instant invention. For example, it often is desirable to have a switching circuit characteristic which comes down very rapidly from the body breakdown point, and, at the same time, preserving the peak of the breakdown characteristic. Generally, this may be obtained by keeping the emitter current low until body breakdown occurs and then placing a large forward bias on the emitter such as by placing a large impedance in the base-emitter loop. An illustrative circuit for realizing these desired operating conditions is shown in Fig. 3 which discloses an avalanche switch connected at terminals 60 and 61 to a pair of subsets 54 and 55, respectively, which comprise an avalanche transistor 56 including a plurality of contiguous zones of opposite conductivity type defining a collector 57, a base 58 and an emitter 59. A resistance 62 is connected between the base 58 and terminal 61 for providing a continuous negative resistance after breakdown, as explained above. A nonlinear element 63, which advantageously may be a silicon diode, is connected in the emitter circuit between the emitter 59 and terminal 61. The purpose of rectifying element 63 is to delay the increase of emitter current until after the body breakdown voltage $V_B$, has been reached. Silicon diodes advantageously may be employed for the purpose since they possess the characteristic of passing very little current in the forward direction until the forward voltage drop reaches a given value, such as approximately one-half of a volt, after which the diode exhibits a low forward resistance. In effect, the diode acts as a low voltage bias battery which prevents emitter current from flowing until the bias is overcome by the forward voltage across the base impedance 62.

Figure 4:
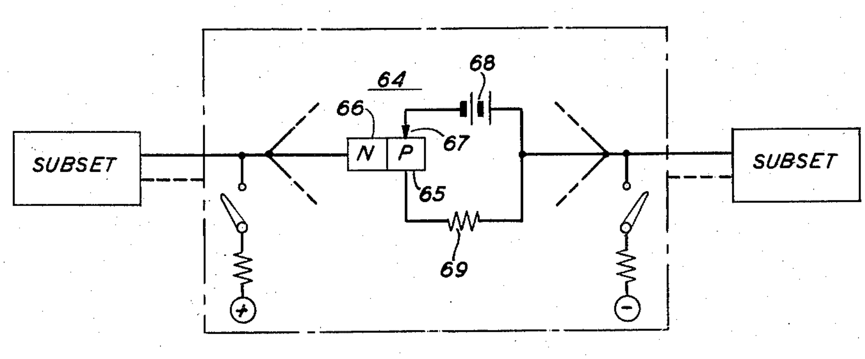

Thus, if desired, a source of bias potential, such as a battery, may be connected in the emitter circuit. Fig. 4 shows such an arrangement which comprises an avalanche transistor having a base zone 65, a collector zone 66 contiguous thereto and defining a collector junction therewith, and a point contact emitter 67 bearing against the base zone 65. The emitter 67 is biased in the reverse direction relative to the base zone 65 by a potential source such as battery 68; a base impedance 69 is connected between the battery 64 and the base.

Figure 5:
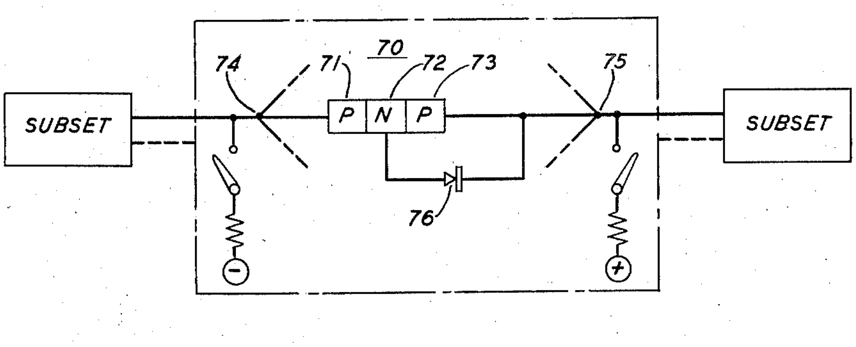

Another illustrative circuit for effecting an increase in the fall rate of the breakdown characteristic is shown in Fig. 5 of the drawing which discloses an embodiment comprising an avalanche transistor 70, including a collector zone 71, a base zone 72, and an emitter zone 73, connected between a pair of terminals 74 and 75. A semiconductor diode 76, which advantageously may be germanium, is connected between the base zone 72 and terminal 75. As is known in the art, a germanium diode which is reverse-biased has the characteristic of low impedance for all values of current therethrough up to the saturation current point. At saturation, the impedance of the diode becomes very high. In the operation of the circuit at Fig. 5, the impedance of diode 76 therefore initially will be low and most of the total current will flow through the base circuit. When the saturation point, $I_s$, which advantageously is high to preserve the peak of the breakdown characteristic of diode 76 is reached, its impedance becomes very high and the major portion of the current flow is transferred to the emitter circuit, thereby resulting in the desired negative resistance characteristic.

Although several circuit embodiments have been described herein by way of illustration, it is apparent that there are other possible modifications of the basic configurations described. For example, it will be obvious to those skilled in the art that the two terminal avalanche transistor switching circuits disclosed herein as incorporated in crosspoint switching networks find equal advantageous use in a large variety of other networks wherein there is need for a low power, fast acting switch.

It also is apparent that any of the disclosed circuits can be modified to accommodate avalanche transistors of polarities opposite those shown, or other type of avalanche transistors with appropriate changes in the circuit arrangements.

It will be understood that such modifications and changes may be made without departing from the spirit and scope of the invention.

What is claimed is:

1. A switching arrangement comprising a semiconductive body having an intermediate base zone of one conductivity type and on opposite sides thereof emitter and collector zones of the opposite conductivity type for defining therewith emitting and collecting junctions, emitter, base, and collector electrodes connected respectively to the emitter, base, and collector zones, the emitter-base electrode branch path consisting of linear passive impedance means, the emitter-collector electrode branch path comprising serially connected utilization means and switching control means, and a single base-collector electrode branch path comprising in series connection said linear passive impedance means, said utilization means and said switching control means, said switching control means including means for first establishing across the collecting junction of the semiconductive body a reverse voltage for initiating avalanche breakdown of said junction and thereafter maintaining across said junction a reverse voltage for sustaining a closed condition between the emitter and collector zones, and means for finally reducing the reverse voltage across said collecting junction for restoring the high impedance condition between the emitter and collector zones.

2. In a communication system a switching element comprising a pair of terminals, a junction-type semiconductor body comprising a base zone of one conductivity type and emitter and collector zones of the other conductivity type defining emitter and collector junctions, respectively, with said base zone, circuit means connecting said emitter zone with one of said terminals and said collector zone with the other of said terminals, and means for applying a voltage across said collector junction including means for interrupting said application of voltage, characterized in that a linear passive impedance element is connected between said base zone and said emitter zone, and that said collector junction is of the type which undergoes avalanche breakdown upon the application of a voltage of reverse direction and definite magnitude and remains in the breakdown condition under a smaller applied voltage, and that said voltage means is of the direction and magnitude to initiate avalanche breakdown in said collector junction.

3. In a communication system a first set of terminals, a second set of terminals, a network for establishing interconnecting alternating current transmission paths selectively between any one of said first set of terminals and at least one of said second set of terminals, said network comprising means defining a circuit between each of said first set of terminals and each of said second set of terminals, each said circuit means including a semiconductor crosspoint switching element, a voltage source for applying a voltage across each said switching elements, and a circuit interrupting means for controlling the application of said voltage to said switching elements, each said switching element comprising a junction-type semiconductor body consisting of a base zone of one conductivity type and emitter and collector zones of the other conductivity type defining emitter and collector junctions, respectively, with said base zone, said collector junction being of the type which undergoes avalanche breakdown upon the application of a voltage of reverse direction and definite magnitude and remains in the breakdown condition under a smaller applied voltage with a continuous negative resistance characteristic, and an impedance element connected between said base zone and said emitter zone, said voltage means being of the direction and magnitude to initiate avalanche breakdown in said collector junction.

References Cited in the file of this patent

UNITED STATES PATENTS 2,655,608 Valdes ---------------- Oct. 13, 1953
2,655,609 Shockley -------------- Oct. 13, 1953